March 4, 1930.   M. C. MACPHERSON   1,749,495
BRAKING OF THE UNDERCARRIAGE OR LANDING
WHEELS OF AEROPLANES AND LIKE AIRCRAFT
Filed April 5, 1928   2 Sheets-Sheet 1
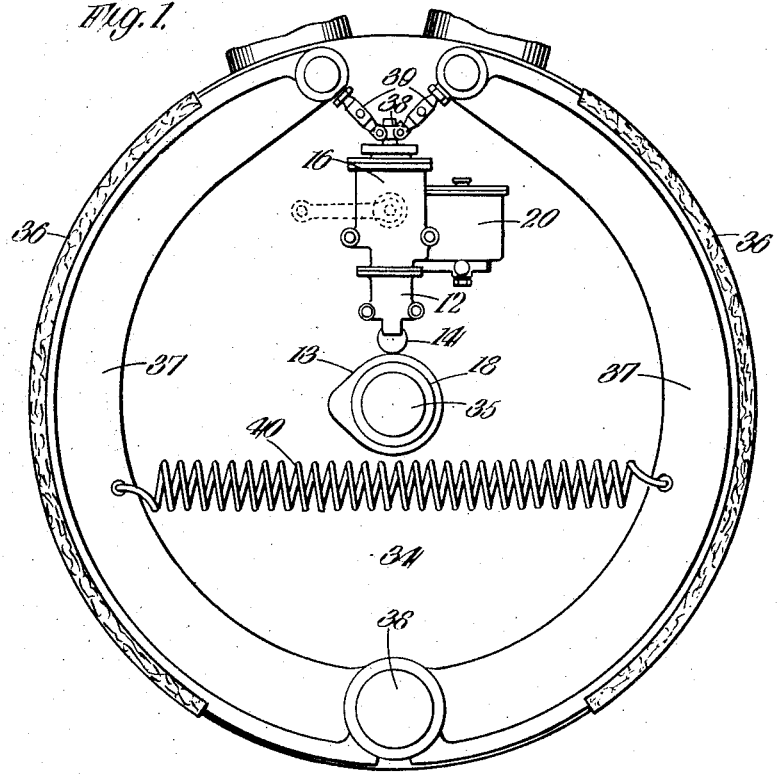
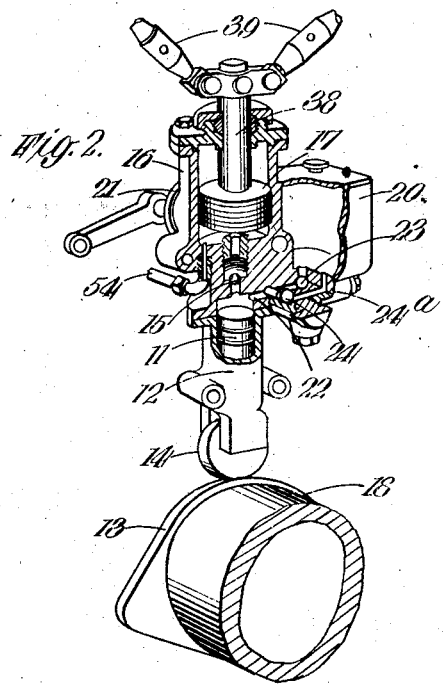
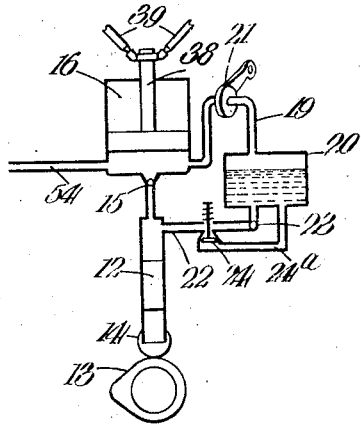
Inventor:
Martyn Clissold MacPherson,
Atty.

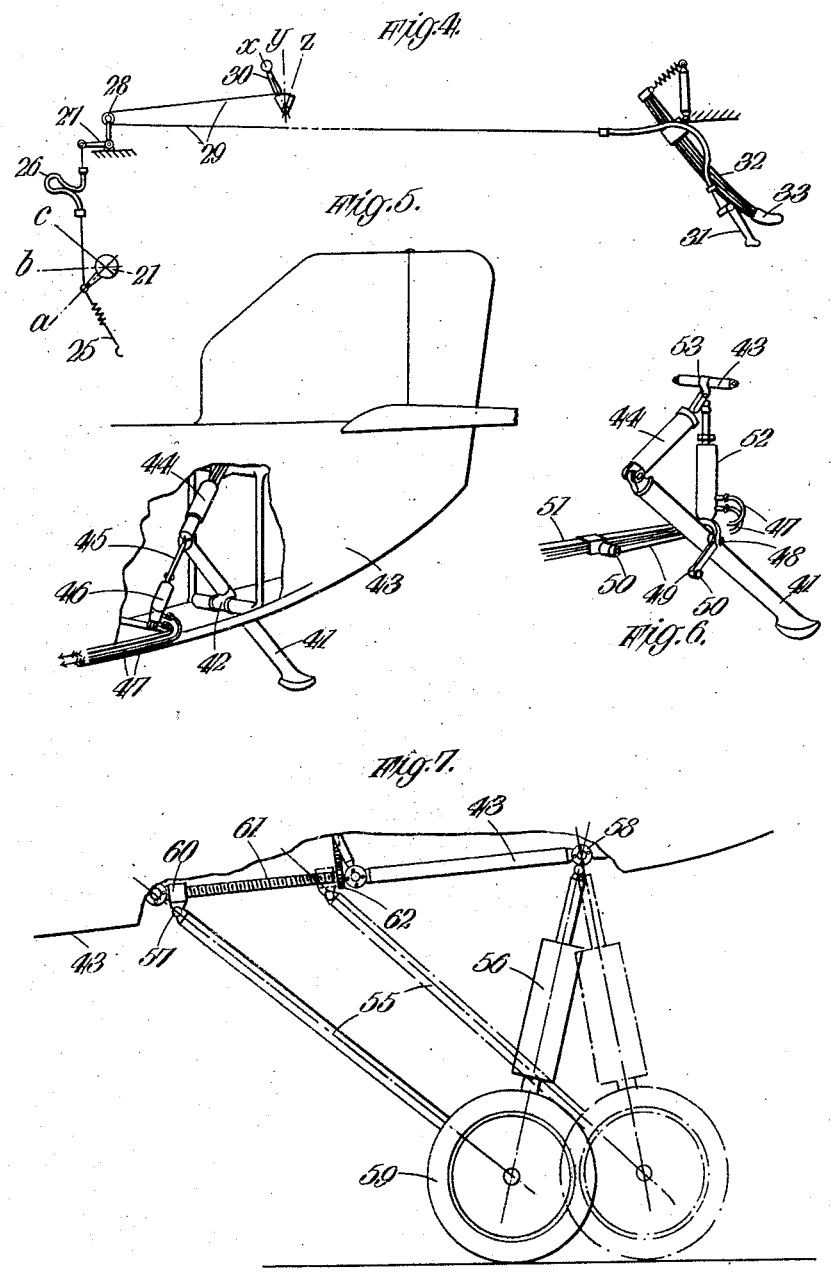

Patented Mar. 4, 1930

1,749,495

UNITED STATES PATENT OFFICE

MARTYN CLISSOLD MACPHERSON, OF HAYES, ENGLAND, ASSIGNOR TO CHARLES RICHARD FAIREY, OF HAYES, ENGLAND

BRAKING OF THE UNDERCARRIAGE OR LANDING WHEELS OF AEROPLANES AND LIKE AIRCRAFT

Application filed April 5, 1928, Serial No. 267,771, and in Great Britain April 27, 1927.

In a braking system for the undercarriage or landing wheels of an aeroplane or like aircraft, it has been proposed to employ fluid-pressure brakes and actuating and controlling means therefor such that the brakes are adapted to function so long only as the pressure of the rear portion of the machine bears upon the landing surface, the fluid-pressure being produced by pumping action, which is due to and dependent upon the load borne by the landing wheels, and, in some cases, dependent also upon the load borne by the tail-skid or equivalent member.

By the present invention, the brakes are adapted to function so long only as the pressure of the rear portion of the machine bears upon the landing surface, and according to this invention, the fluid-pressure for actuating the brakes is obtained from pumping action due to rotation of the landing wheels and/or movement of the tail-skid or equivalent landing.

For these purposes, the plunger of a fluid-pressure pump may be actuated, through cam or other mechanism, by the revolution of a landing wheel, the pump delivering through a non-return valve to the cylinder of a fluid-pressure brake, the pressure in which is either rendered (more or less) effective upon the brake-piston, or alternatively is returned (less or more) through a by-pass back to the pump cylinder by way of a reservoir, according to the position of a control-valve governed, on the one hand automatically by movement of the tail-skid (or equivalent member) when bearing upon the ground, and on the other hand, at will by the pilot. The delivery from the pumping cylinder may be provided with an automatic relief valve for determining the maximum braking pressure, the opening of said valve having for effect to permit the fluid pumped to return by way of a by-pass to the reservoir.

In cases where the pumping action is due to movement of the tail-skid (or equivalent member), the plunger of a fluid-pressure pump may be so connected with the tail-skid as to be actuated by angular displacement of the latter, the pump delivering through a non-return valve to the cylinder of a fluid-pressure brake acting and controlled as already stated.

In addition, means may be provided for enabling the position of the landing wheels relatively to the fuselage to be varied in the fore-and-aft direction for the purpose of adjusting the effective load on the tail-skid or equivalent member.

The invention will be described with reference to the accompanying drawings, all of which are partial and more or less rudimentary or diagrammatic, and in which Figures 1, 2 and 3 illustrate a convenient arrangement of self-contained "hydraulic unit" (comprising pumping and brake cylinders, with the more immediately associated parts) for use in cases where said unit is completely enclosed within the brake-drum of an internal brake; Figure 1 being an elevation viewed in a direction parallel to the wheel-axis with the near side of the brake-drum removed, Figure 2 is a perspective view, partly broken away to shew the interior construction of the pumping and brake cylinders and reservoir, and Figure 3 an elementary diagram of the pump connections. Figure 4 is a diagrammatic side elevation illustrating one arrangement of mechanical connections for enabling the control-valve to be governed by the pilot and/or the tail-skid. Figures 5 and 6 are perspective views shewing respectively two different arrangements wherein the pumping cylinder is so mounted in proximity to the tail-skid as to permit of its piston being actuated by the movements of the skid. Figure 7 is a starboard side elevation shewing means for enabling the position of the landing-wheels fore-and-aft of the fuselage to be altered at will for the purpose of adjusting the effective load on the tail-skid.

In the arrangement illustrated in Figures 1, 2 and 3, the plunger 11 of an oil-pump is adapted to be reciprocated in the stationary pumping cylinder 12 by means of an edge-cam 13 presenting one or more peaks and revolving as one with an undercarriage wheel; a roller 14, carried by a downward extension of the plunger, bearing against the edge of the cam. The liquid is delivered by the pump through a non-return valve 15 to a brake-cylinder 16 whereof the piston 17 is connected through suitable rigging with internal and/or external brake-shoes operating upon a brake-drum on the wheel-hub 18, whilst the fluid pressure within the brake-cylinder 16 is either rendered (more or less) effective upon the brake-piston 17 or alternatively is returned (less or more) through a by-pass 19 (Figure 3) back to the pumping cylinder 12 by way of a reservoir 20, according to the position of a control-valve 21 governed, on the one hand automatically by movement of the tail-skid (or some part carried thereby) when bearing on the ground or other landing surface, and on the other hand at will by the pilot.

The suction passage 22 from the reservoir 20 to pumping cylinder 12 is provided with a non-return inlet valve 23, and the delivery from the cylinder 12 may be provided with a relief valve 24, spring-loaded to correspond with the predetermined maximum braking pressure; the opening of the relief-valve having for effect to permit the fluid pumped to return from the cylinder 12 to the reservoir 20 by way of a by-pass 24$^a$.

The control-valve 21, which is preferably of the rotary disc type, has three positions $a$, $b$ and $c$ (Figure 4); the valve being fully open in each of its extreme positions $a$ and $c$, which are preferably about 90 degrees apart, and shut in its mid position $b$ wherein it completely closes the by-pass 19 leading from the brake-cylinder to the pumping-cylinder. The control-valve 21 constantly tends under the action of a spring 25 to assume its normal extreme position $a$, from which it is movable by Bowden-wire or other convenient mechanism 26 connected with a lever 27 whereof one arm carries a pulley 28 around which is passed a cable 29, the opposite ends of this cable being attached respectively to a three-position hand-lever 30 near the pilot's seat and to a two-position lever 31 pivoted at 32 on the spring-influenced tail-skid 33 and adapted to be moved by contact with the ground. The arrangement is such that the control-valve spring 25 has sufficient strength to retain the valve 21 in its normal extreme position $a$ against the force which can be exerted either by the pilot's hand-lever 30 alone when moved from its normal position $x$ to its mid position $y$, or by the tail-skid lever 31 alone when moved through its total range; whereas, when the pilot's hand-lever 30 has been moved from its normal position $x$ to its mid position $y$, subsequent movement of the tail-skid lever 31 will cause the control-valve 21 to move more or less to its mid position $b$, whilst further movement of the pilot's hand-lever to the extreme limit $z$ of its travel will shift the control-valve 21, against its spring 25, to the extreme limit $c$ of its movement.

It will thus be seen that, assuming the pilot (when approaching the landing place) to have moved his hand-lever 30 from its normal position $x$ to its mid position $y$, the control-valve 21 will remain open so that, even when the landing wheels revolve on touching the ground and the pump is consequently actuated, the liquid pumped will be by-passed through the reservoir 20 and the brakes will not be applied unless or until the tail-skid 33 comes into contact with the ground, whereupon, as soon as the control-valve spring 25 has been overcome, the control-valve 21 will be closed and the liquid pumped will take effect upon the brake-piston 17 so as to cause the brakes to be applied; whilst at any moment the pilot, by moving his hand-lever beyond its mid position $y$ to the extreme limit $z$ of its travel, can again open the control-valve 21 and thus, by again by-passing the liquid pumped, release the brakes notwithstanding continued contact of the tail-skid 33 with the ground.

In the example under consideration, the brake shown in Figure 1 is an internal brake, and the "hydraulic unit" (comprising the pumping-cylinder 12, the brake-cylinder 16, the reservoir 20, and the more immediately associated parts as seen in Figure 2) is mounted on a stationary disc 34 (Figure 1) mounted concentrically on the landing wheel axle 35, the disc 34 serving as a closure for the inner side of the brake-drum 36, which latter is carried by the wheel-hub 18 so as to revolve therewith. The brake-shoes 37, 37 are pivoted at 38, by one end of each, to the disc 34 at a point diametrically opposite to the main axis of the hydraulic unit (i. e. the common axis of the cylinders 12 and 16), which latter axis extends radially of the axle 35; the shoes 37, each of which is approximately semi-circular, being coupled by their other ends to the upper end of the brake piston-rod 38 by a pair of toggle-links 39, 39. When the brake-piston 17 (Figure 2) is forced upwards by the action of the pump, the upper ends of the brake-shoes 37 are forced apart into contact with the inner periphery of the rotary brake-drum 36 against the action of a spring 40 which constantly tends to retract the shoes to their normal inoperative position.

In a modification, which may be employed either alone or in conjunction with the form described above, the piston of an oil-pump is so connected with the tail-skid as to be actuated by angular movement of the latter, the pumping cylinder being connected with the brake-cylinder and reservoir as before, through suitable tubing and valves, and the circulation of liquid being, also as before, regulated by a control-valve which, however, is in the present case governed only by the pilot's hand-lever.

In one example of this modified arrangement, illustrated in Figure 5, the tail-skid is constituted by a lever 41 fulcrumed at 42 directly to the fuselage 43 and tending under the influence of a spring-returned "oleo shock-absorber" 44 to maintain a normal angular position; the shock-absorber 44 acting upon an upward prolongation of the tail-skid lever whilst the piston rod 45 of the pump 46 extends in substantial alignment with that of the shock-absorber and at right angles to the tail-skid 41. The pipe connections leading from the pumping-cylinder to the brake-cylinder, reservoir, and control-valve, are indicated at 47.

In another example of the modified arrangement, illustrated in Figure 6, the tail-skid lever 41 is fulcrumed at 48 between the limbs of a substantially horizontal "merry-thought" lever 49 the forwardly-directed extremities 50 of which are pivoted to the fuselage (not shewn) directly or through springs such as 51; the pumping-cylinder 52 being interposed, with its axis substantially upright, between the rearwardly-directed bow of said lever and the fuselage 43, whilst the oleo shock-absorber 44, connected with an upward prolongation of the tail-skid lever 41, extends at substantially right angles thereto to the stationary point of attachment 53 of the pumping piston rod. This last-mentioned arrangement affords the advantage of avoiding sudden applications of the brakes when the tail-skid 41 is passing over rough ground; the varying shocks due to such passage producing little appreciable pumping-effect apart from the otherwise steady load on the tail-skid.

A spring-supported ground-wheel may be carried by or substituted for the more usual type of lever used as a tail-skid, and, in each form of the modification above described, the pumping action may be obtained from either the vertical movement or the rotation of said wheel consequent on the latter encountering the ground on landing.

Preferably, brakes are provided on all the landing wheels, and, where the pumps are operated by rotation of said wheels, there may be a pumping-cylinder actuated by each wheel, whilst all brake-cylinders should be interconnected. One end of a pipe connection for this purpose is indicated at 54 in Figures 2 and 3.

Figure 7 shews one example of means which may be adopted for the purpose of adjusting the effective load on the tail-skid to suit varying conditions. In the example, the usual undercarriage is attached to the fuselage 43 on the one hand by a rearwardly and upwardly extending link 55, and on the other hand by a more or less upright oleo shock-absorber 56, the distance separating the respective points of attachment 57, 58 of said link and shock-absorber to the fuselage being variable at the will of the pilot, so as to cause the position of the ground-wheels 59 of the undercarriage to be altered in the fore-and-aft direction relatively to the fuselage.

Any convenient means may be employed for producing such variation in the distance separating the points of attachment 57, 58 of the link 55 and shock-absorber 56 to the fuselage 43. In the example, the upper end of the link 55 is pivoted at 57 to a nut 60 which engages a substantially horizontal fore-and-aft screw-shaft 61 journalled at its ends in bearings provided on the fuselage, the shaft 61 having fast on one of its ends a sprocket-wheel 62 whereby it may be rotated in either direction at will through a chain and similar sprocket-wheel mounted in convenient proximity to the pilot's seat.

I claim:—

1. Means for braking a landing wheel of an aeroplane, comprising a brake for said wheel, a brake cylinder, a piston fitted to reciprocate therein and adapted to be operatively coupled to the brake, a pump cylinder, a piston fitted to reciprocate therein, means actuated by the rotation of a landing wheel and adapted to operate said pump piston, a reservoir for fluid, a connection between the pump cylinder and brake cylinder, a non-return valve in said connection, a connection between the reservoir and the pump cylinder, a connection between the brake cylinder and reservoir, and a valve interposed in said last mentioned connection and adapted to be controlled by the pilot for determining the ratio in which the fluid delivered under pressure from the pump cylinder shall be rendered effective in the brake cylinder or shall be returned to the reservoir as the case may be.

2. Means for braking a landing wheel of an aeroplane, comprising a brake for said wheel, a brake cylinder, a piston fitted to reciprocate therein and adapted to be operatively coupled to the brake, a pump cylinder, a piston fitted to reciprocate therein, means actuated by the rotation of a landing wheel and adapted to operate said pump piston, a reservoir for fluid, a connection between the pump cylinder and brake cylinder, a non-return valve in said connection, a connection between the reservoir and the pump cylinder, a non-return valve in said connection, a relief valve on said connection between said non-return valve and the pump cylinder, a connection from the delivery side of said relief valve to the reservoir, a connection between the brake cylinder and the reservoir, and a valve interposed in said last mentioned connection and adapted to be controlled by the pilot for determining the ratio in which the fluid delivered under pressure from the pump cylinder shall be rendered effective in the brake cylinder or shall be returned to the reservoir as the case may be.

3. Means for braking a landing wheel of an aeroplane, comprising a brake for said wheel, a brake cylinder, a piston fitted to reciprocate therein, means actuated by the rotation of a landing wheel and adapted to operate said pump piston, a reservoir for fluid, a connection between the pump cylinder and brake cylinder, a connection between the brake cylinder and the reservoir, a control valve interposed in said last mentioned connection and having two limit positions in each of which said connection is open, and a mid position in which said connection is closed, a skid-lever mounted on the aeroplane towards the rear end thereof and adapted for actuation by contact with the ground in landing, a hand lever controllable by the pilot, mechanical connections between said control valve and the skid lever and hand lever, and a spring adapted normally to retain the control valve in one of its limit positions, said spring being of sufficient strength to prevent movement of the skid lever from causing the control valve to shift from its normal limit positions unless the hand lever is concurrently moved from normal position.

4. Means for braking a landing wheel of an aeroplane, comprising a brake for said wheel, a brake cylinder, a piston fitted to reciprocate therein, means actuated by the rotation of a landing wheel and adapted to operate said pump piston, a reservoir for fluid, a connection between the pump cylinder and brake cylinder, a connection between the brake cylinder and the reservoir, a control valve interposed in said last mentioned connection and having two limit positions in each of which said connection is open, and a mid position in which said connection is closed, a skid-lever mounted on the aeroplane towards the rear end thereof and adapted for actuation by contact with the ground in landing, a hand lever controllable by the pilot, a spring adapted normally to retain the control valve in one of its limit positions, a mechanical connection between the skid lever and hand lever, and a mechanical connection between said mechanical connection and said spring such that the stress of the spring can be overcome only by conjoint actuation of the skid lever and hand lever.

5. A braking system for the undercarriage or landing wheels of an aeroplane or like aircraft, comprising fluid-pressure brakes, actuating and controlling means therefor, said actuating and controlling means being so arranged that said fluid-pressure brakes are adapted to function so long only as the pressure of the rear portion of the machine bears upon the landing surface, and pumping means operated by rotation of the landing wheels for creating the fluid-pressure for actuating the brakes.

6. A braking system for the undercarriage or landing wheels of an aeroplane or like aircraft, comprising fluid-pressure brakes, actuating and controlling means therefor, said actuating and controlling means being so arranged that said fluid-pressure brakes are adapted to function so long only as the pressure of the rear portion of the machine bears upon the landing surface, and pumping means operated by rotation of the landing wheels and by a member at the tail of the machine for creating the fluid pressure for actuating the brakes.

MARTYN CLISSOLD MACPHERSON.